(12) United States Patent
Vicard et al.

(10) Patent No.: US 6,171,366 B1
(45) Date of Patent: Jan. 9, 2001

(54) CONTROL SYSTEMS FOR OPERATING GAS CLEANING DEVICES

(75) Inventors: Jean-Francois Vicard, Lyons (FR); Frank Gallo, Wanaque, NJ (US)

(73) Assignee: Lab, S.A., Lyons (FR)

( * ) Notice: Under 35 U.S.C. 154(b), the term of this patent shall be extended for 0 days.

(21) Appl. No.: 09/142,692

(22) PCT Filed: Apr. 23, 1997

(86) PCT No.: PCT/US97/06178

§ 371 Date: Sep. 14, 1998

§ 102(e) Date: Sep. 14, 1998

(87) PCT Pub. No.: WO97/39816

PCT Pub. Date: Oct. 30, 1997

Related U.S. Application Data

(60) Provisional application No. 60/016,081, filed on Apr. 23, 1996.

(51) Int. Cl.[7] .............................. B01D 46/04; B01D 46/46
(52) U.S. Cl. .............................. 95/1; 95/10; 95/20; 95/29; 95/280; 55/283; 55/292; 55/293; 55/302
(58) Field of Search .............................. 95/1, 10, 20, 25, 95/29, 6, 7, 278, 279, 280, 281, 282; 55/283, 292, 293, 302; 96/425, FOR 168

(56) References Cited

U.S. PATENT DOCUMENTS

| | | | |
|---|---|---|---|
| 3,577,705 | 5/1971 | Sharlit | 55/302 |
| 4,277,255 * | 7/1981 | Apelgren | 55/283 |
| 4,535,209 * | 8/1985 | Kurz | 200/83 R |
| 4,786,293 | 11/1988 | Labadie | 55/302 |
| 5,215,555 | 6/1993 | Graff | |
| 5,427,596 | 6/1995 | Jorgenson et al. | 55/302 |
| 5,484,536 | 1/1996 | Yamaguchi et al. | 95/20 |

FOREIGN PATENT DOCUMENTS

| | | |
|---|---|---|
| 525710 | 1/1954 | (BE). |
| 3336487 | 4/1985 | (DE). |
| 56-89816 | 7/1981 | (JP). |
| 58-92440 | 6/1983 | (JP). |
| 60-143814 | 7/1985 | (JP). |
| 5-337315 | 12/1993 | (JP). |
| 6-190229 | 7/1994 | (JP). |
| 1301464 | 4/1987 | (SU). |

* cited by examiner

*Primary Examiner*—C. Scott Bushey
(74) *Attorney, Agent, or Firm*—Dowell & Dowell, P.C.

(57) ABSTRACT

Systems and methods for cleaning and operating gas cleaning devices using vibration generators wherein the systems include sensors and programs for monitoring and predicting resonant conditions of different surface areas and zones in order to vary the frequency and amplitude of vibrations to establish optimum resonant conditions on such surface areas or zones and thereby optimize cleaning and operation of such gas cleaning devices.

19 Claims, 2 Drawing Sheets

CONTROL SYSTEMS FOR OPERATING GAS CLEANING DEVICES

This application is the national stage application filed under 35 U.S.C. 371 on Apr. 23, 1997 as PCT/US97/06178, which claims priority under 35 U.S.C. 119(e) to U.S. Provisional application Ser. No. 60/016,081, filed Apr. 23, 1996, now abandoned.

BACKGROUND OF THE INVENTION

The present invention is directed to providing fluid/particle separators and gas cleaning devices and/or gas cleaning systems such as, for instance, electrostatic precipatators (ESP), bag filters (BF), spray dryer absorbers (SDA), evaporative coolers, cyclones, venturi scrubbers, dry systems, humidified dry systems, semi-dry systems, wet systems, combined systems, mechanical separators and the like, with vibration means coupled with control means capable of varying the frequency and amplitude of the vibrations being generated. More particularly, the present invention is directed to control systems and methods for controlling vibration inducing or generating devices utilized to clean and/or operate components of such separator and gas cleaning systems. The systems utilize controllers having input both supplied directly from sensors mounted at spaced surface portions, zones or on components within such devices, and indirectly from additional sensors for measuring operating parameters such as, for instance, pressure differential between inlets and outlets of such systems and/or flow characteristics into and out of such systems or through filtering materials associated with such systems as well as power, voltage, and current conditions of motors associated with fans, blowers, pumps and other equipment associated with such separator and filtering devices for purposes of creating control signals to the generating devices for varying vibration frequencies and amplitudes for developing resonant frequency conditions at various zones and/or on various components of such systems and devices to thereby optimize the operation thereof. Additionally, the controllers may be programmed to provide control signals using previously accumulated data concerning operating characteristics of the same or similar devices or systems.

HISTORY OF THE RELATED ART

Many gas cleaning devices require vibration means either to clean surfaces such as, for instance, the collecting plates of electrostatic precipitators, and the bags of bag filters, or to clean surfaces where non-desired build-up occurs such as, for instance, the wall of a spray dryer absorber, or to vibrate particles suspended in the gases to be cleaned such as, for instance, droplets to be evaporated in an evaporative cooler, particles to absorb gaseous pollutants in a spray dryer absorber, and agglomeration of fine particles with coarser particles. Such vibration means are operated at fixed vibration frequency and amplitude even if they operate periodically according to a sequence that can be automatically adjusted on the basis of the gas cleaning device operation (for instance, the pressure drop of a bag-type dust filter).

Heretofore there have been numerous control systems developed for gas cleaning devices of the type set forth above for periodically cleaning the interior surface areas of such devices. Some conventional systems are simply timed systems which are effective to terminate the normal operations of such devices in order to effect a cleaning cycle. During the cleaning cycle, various mechanical and/or air current and/or acoustical devices are utilized to establish vibrations of the surfaces within the system to loosen or discharge accumulated particulate material including dust, solid particles, water or liquid droplets and the like. Such vibration generators, however, are operated at fixed vibration frequencies and amplitudes. Unfortunately, such timed periodic cleaning systems are not effective for optimizing the cleansing of the various interior surface areas or components associated with such separators or cleaning devices. For instance, in a conventional bag-type dust filter, the surface characteristics of bags and the particulate material to be removed therefrom differs substantially from the surface characteristics of adjacent walls of the filter housing and the particulate material collected thereon. The vibration frequency created by mechanical or air current or acoustical devices affects each of these surfaces differently. That is to say, each surface area within the filter system has a different resonance frequency which is dependent on its structure and which is also affected by the particulate build-up thereon. Thus, each surface reacts differently at a given frequency. Therefore, during a timed cleaning cycle, the extent of cleaning of surface areas having different surface characteristics and having different particulate build-up varies greatly from one component to another component of the system. Under such circumstances, it may be necessary to prolong unreasonably the cleaning cycle to ensure that each of the components and surface portions of a particular filter, or other separator, are effectively cleaned.

To enhance the efficiency of cleaning systems, some prior art devices have utilized real time condition monitors for controlling the operation of cleaning devices. A number of prior art cleaning systems incorporate pressure transducers which are mounted on opposite sides of a filter so that a difference in pressure may be determined between the upstream and downstream sides of the filter. When a condition is sense such that the pressure drop reaches a predetermined level, the control system activates the cleaning equipment, either mechanical or with air current or acoustical, in order to initiate a cleaning cycle of the components of the system. Again, such real time monitoring of pressure conditions does not account for the difference in surface characteristics nor the difference in material build-up upon the various components of the system and, once a cleaning cycle has been initiated, the cycle is normally maintained for an averaged period of time to effect a general cleaning of the system. Such an averaged cleaning cycle may not be adequate to clean some elements of the system, and, again, the vibration generators used in such systems are operated at a fixed frequency and amplitude. An example of such control systems are disclosed in U.S. Pat. No. 4,277,255 to Apelgren.

Additional improvements have been made with respect to computer controlled systems for cleaning particle separators and related equipment. U.S. Pat. No. 5,427,596 to Jorgenson et al., discloses a diagnostic control system for dust collectors which utilizes a micro-processor which interfaces with various sensors and software programming to monitor and control operation of the collector and cleaning system. The patent discloses that various operating parameters of a filter system are continuously monitored and compared with internal software to give immediate indications of conditions of filters and other components of the collector. Such input sensors include motor current sensors, filter pressure drop sensors, internal temperature sensors and the like. Signals received from these sensors are processed to determine operating conditions and failures within the collector. Operation of the collector including cleaning cycles is thus controlled by the data received and by internal software programming. However, as with other prior art cleaning systems, there has been no provision made for monitoring various components or zones of the collector for purposes of determining the exact resonance conditions of spaced elements so as to vary vibration frequencies and amplitudes of generators used to create vibrations used to dislodge material build-up within the collector. The control system also does not control vibration frequencies based upon conditions which include the build-up of material on the various surfaces exposed to vibrations during a cleaning cycle. Therefore, the control system does not effectively control nor vary vibration frequencies and amplitudes for purposes of cleaning the different surfaces within the collector.

Additionally in the field of gas absorption, U.S. Pat. No. 4,535,209 to Pfoutz discloses enhancement of gas/solid particles reaction through acoustics in a semi-dry system. A sonic horn vibrates the sprayed slurry droplets. But again the frequency of the sonic horn, selected case by case, does not adequately function to evaporate efficiently all the droplets and boost the gas absorption.

SUMMARY OF THE INVENTION

The present invention is directed to providing fluid/particle separators and gas cleaning devices and/or gas cleaning systems such as, for instance, electrostatic precipatators (ESP), bag filters (BF), spray dryer absorbers (SDA), evaporative coolers, cyclones, venturi scrubbers, dry systems, humidified dry systems, semi-dry systems, wet systems, combined systems, mechanical separators and the like, with vibration means coupled with control means capable of varying the frequency and amplitude of the vibrations being generated. Each controller is operatively connected to one or more vibration generators, which may be in the form of a mechanical shaker device, acoustic horn, loud speaker diaphragm, gas current generator or air current generator, and which functions to create vibrations within the gas cleaning device and/or system. In a preferred embodiment, the frequency and amplitude of the generator is varied depending upon signals received from sensors so that the frequency generated is dependent upon current operating conditions to establish resonant conditions at various surfaces or within various components which are to be vibrated. During vibration activity, the resonant frequency at various locations within the gas cleaning device and/or system will change depending upon the remaining material deposited on the surfaces or on the characteristics of the particles to be vibrated.

In some embodiments, other indirect sensors may be provided such as for sensing pressure drop of a bag filter or of a zone thereof, or for measuring parameter reflecting changes in gas flow through components(s) of a gas cleaning device and/or system, or for detecting pressure drop through components of a gas cleaning device and/or system which information is also supplied to the controller. In addition to the foregoing, other indirect parameters may be supplied to the controller such as the operating voltage, current or power of electrical components including high voltage system of an ESP and motors utilized to drive various equipment including fans and blowers associated with such gas cleaning devices and/or system.

In another embodiment of the present invention, the indirect feed back to the controller may include predetermined data for similar operating systems which has been collected over a period of time. Such predetermined data may also include data previously obtained from the separator or filter being cleaned, such as the resonance frequency of various surfaces when new and without any material build-up. Such data may also include the vibration characteristics of various components of a similar system, such as the resonance frequency of walls or of surfaces of component(s) such as a bag of a bag type filter as they may vary over a period of use and the anticipated build-up of materials over a predetermined time when cleaning or operating with particular gases and substances.

The control systems of the present invention may also include overrides for allowing manual control of the variable frequency vibration generators. In the preferred embodiments, the controller is a computer which is programmed to accept variable parameters including those outlined above and which supplies control signals to generate and vary the operating characteristics of the variable frequency vibration generators.

It is the primary object of the present invention to provide a system for monitoring and controlling the operation of variable frequency vibration generators utilized to clean and/or operate components of a gas cleaning device and/or system so as to change the frequency and the amplitude of vibrations being generated so as to optimize the cleaning and/or the operation of separate components of such device and/or system and wherein the amplitude and frequency of vibration is varied depending upon sensed and/or predetermined or predicted resonance conditions of such separate components.

It is a further object of the present invention to provide a method for controlling sound generators, frequency modulators, vibration inducing mechanisms, air current generators, and the like for purposes of varying vibration frequencies throughout the interior of gas cleaning devices and/or systems so as to optimize the vibrational characteristics therein and of separate components of such systems to thereby facilitate the discharge of material from the surface of such components during cleaning or to optimize operating conditions such as, for instance, absorption conditions by regulating droplet evaporation.

DESCRIPTION OF THE PREFERRED EMBODIMENT

The invention provides fluid/particle separators and gas cleaning devices and/or gas cleaning systems such as, for instance, electrostatic precipatators (ESP), bag filters (BF), spray dryer absorbers (SDA), evaporative coolers, cyclones, venturi scrubbers, dry systems, humidified dry systems, semi-dry systems, wet systems, combined systems, mechanical separators and the like, with vibration means coupled with control means capable of varying the frequency and amplitude of the vibrations being generated. As used herein and in the claims, the terms gas cleaning devices and/or systems refer to such separators, devices and systems as set forth above. It is also to be understood herein and in the claims that such gas cleaning device and/or system consists generally of several zones (such as compartment or cell in a BF or field in an ESP or wall surfaces of dust hoppers in BF, ESP, SDA or the like) and comprises various components (such as collecting plate in ESP or gabs in BF or the like).

The range and/or sequence of such variations are predetermined or are optionally updated by the control means on the basis of the information provided by feedback means measuring and/or evaluating the actual conditions prevailing in different zones of the gas cleaning device and/or system. Such variations are provided to establish resonance conditions on various surfaces in order to remove the collected particulate material or build-up, and/or particles suspended in the gases to be cleaned, so as to facilitate the gas cleaning operations such as, for instance, droplet evaporation, gaseous pollutants absorption, agglomeration of fine particles with coarser particles and the like.

Figure 1:
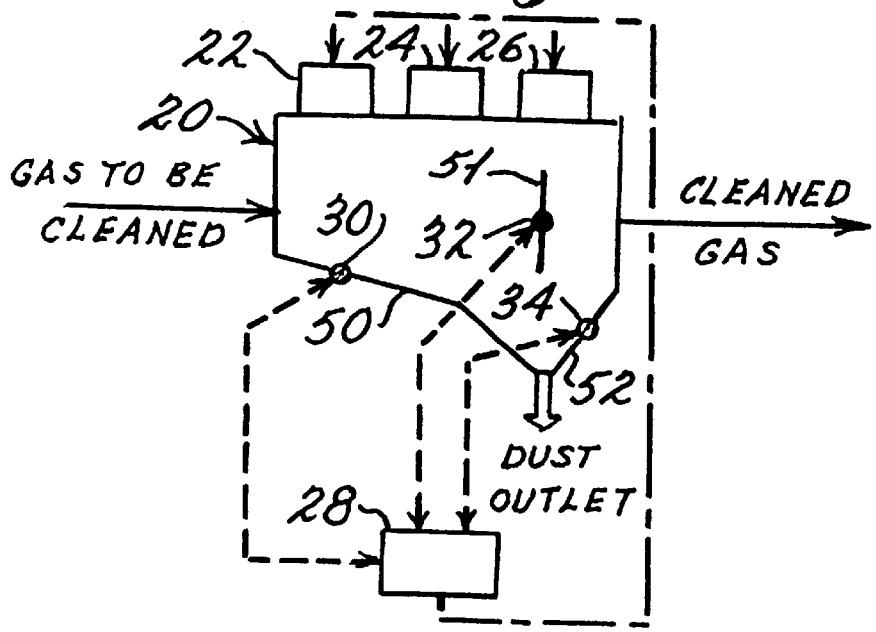
FIG. 1 is a schematic cross-sectional view of a gas/particle separator showing the control system of the present invention, including sensors mounted at various locations within the separator.
Figure 5:
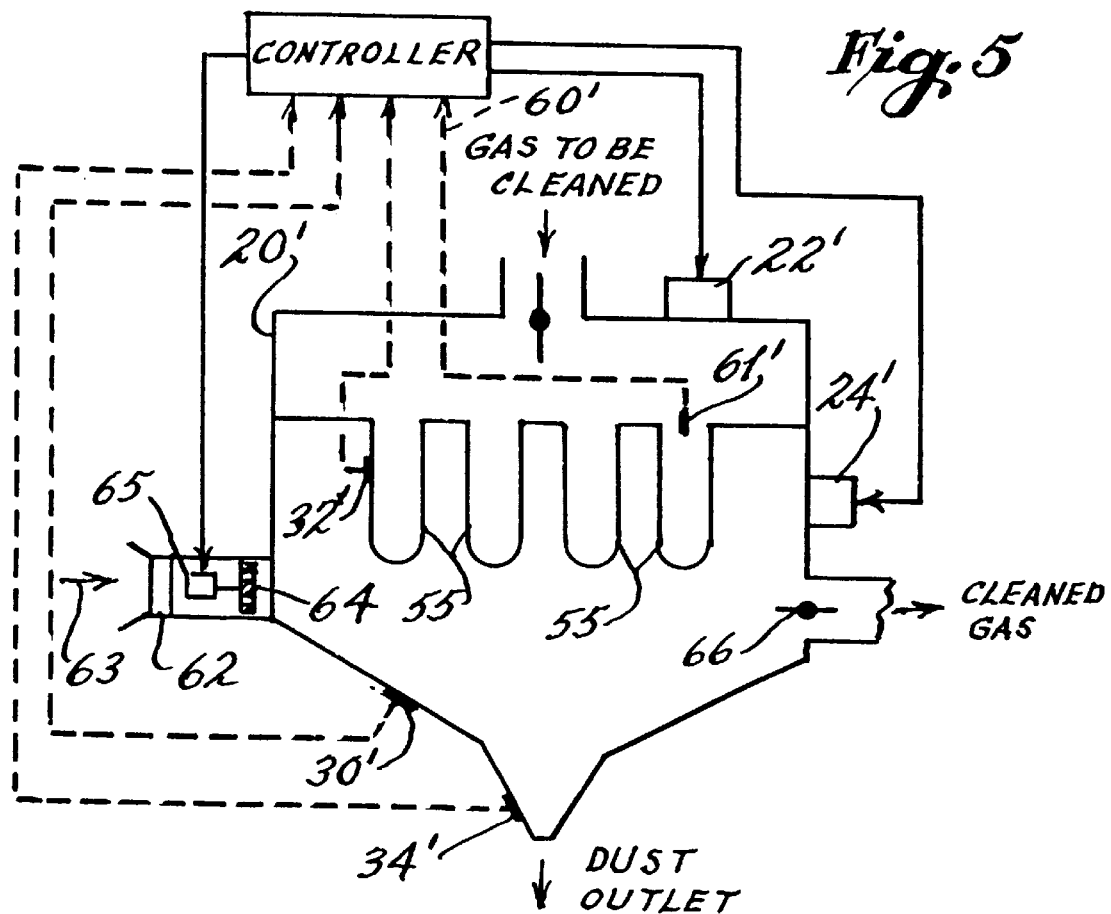
FIG. 5 is a schematic cross-sectional view of a compartment or zone of a bag filter cleaning device incorporating the control system of the present invention, and showing two types of sensors associated with a selected bag within this compartment.

Referring to FIG. 1, the gas cleaning device and/or system 20 is fitted with one or more vibration generating means 22, 24, 26 coupled with control means 28 capable of varying the frequency and the amplitude of the vibrations being generated. According to the invention, the vibration frequency is varied so that the effect of the vibrations is optimized by establishing resonance conditions in the various zones of the gas cleaning device and/or system, taking into account that the required vibration frequency and amplitude is different in the various zones and varies over time. The range and sequence of variations can be either pre-determined or based on the information received from direct feedback sensors 30, 32, 34 that measure or evaluate the actual conditions at the three different zones A, B, C, respectively, of the gas cleaning device and/or system. Zone A is a wall 50, zone B is an internal collecting plate 51 and zone C is a hopper 52 in which the separated dust is collected before being extracted. These feedback sensors can directly measure, for example, the resonance conditions of a collecting plate 51 selected in each zone of an ESP 20 (FIG. 1), or of a bag 55 selected in each zone of a BF 20' (FIG. 5).

The feedback means can also evaluate indirectly 60 (FIG. 4) or 60' (FIG. 5) the resonance conditions by measuring parameters influenced by such resonance conditions, such as, for instance, the absorption efficiency of a gaseous pollutant like $SO_2$ in an SDA spraying lime milk, the amount of water evaporated in an evaporative cooler, the opacity of particles in suspension in gases, or the electrical conditions prevailing in an ESP (including voltage, current, energy or the like).

Figure 4:
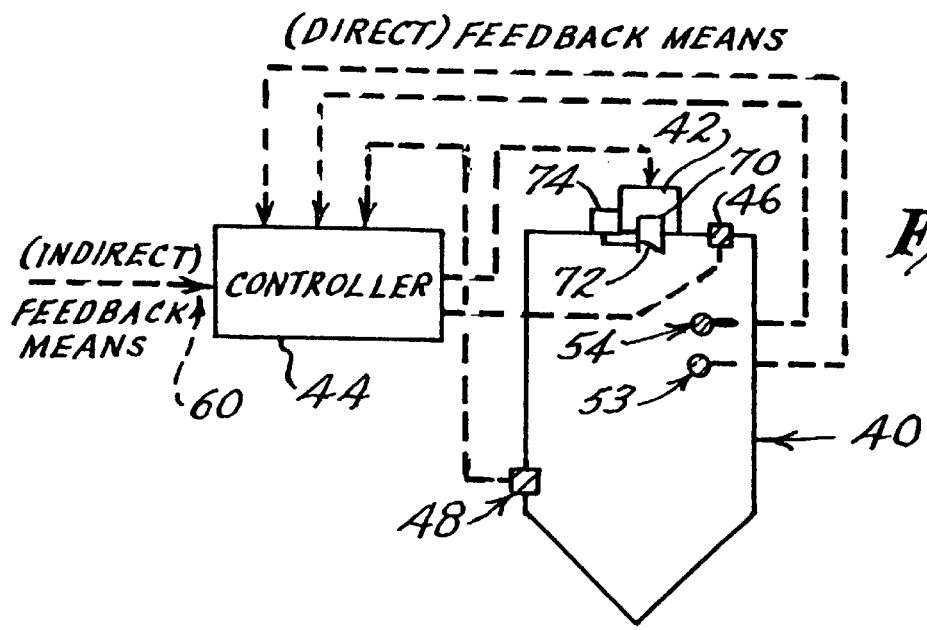
FIG. 4 is a schematic cross-sectional illustration of another gas cleaning device utilized with the control system of the present invention, and showing different types of sensors.

Referring to FIG. 4, in the illustrated embodiment of the invention, acoustic vibrations are generated within the gas cleaning device and/or system 40 by one or more vibration generator(s) 42. The control means 44 is capable of inducing variations of the amplitude and the frequency output of the sound generator(s) 42. The amplitude output of the sound generator can be controlled by varying the amplitude of the power applied to the sound generator, and/or by varying the frequency of the sound generator. Varying the frequency of the sound generator on either side of resonance conditions controls the effective amplitude of the sound. For example, the vibration generator may be a compressed air horn. The amplitude of vibrations can be controlled by a damper 72 located in the output section 70 of the horn. The damper may be electrically operated to adjust the amplitude. An electrically controlled actuator 74 can vary the frequency of the energy produced by such air-type sound generators. The actuator may be, for example, an electromagnetic stepping, servo, linear pressure solenoid or the like used to modify the diaphragm characteristics which affect the frequency of operation. The air flow supply can also be controlled by use of a variable speed air paddle (not shown) to modify the operating frequency.

An electromagnetic sound generator, sound speaker-type device can also be used to provide a broad range of operational frequencies, as well as an output level which can be adjusted based on input power.

Figure 2:
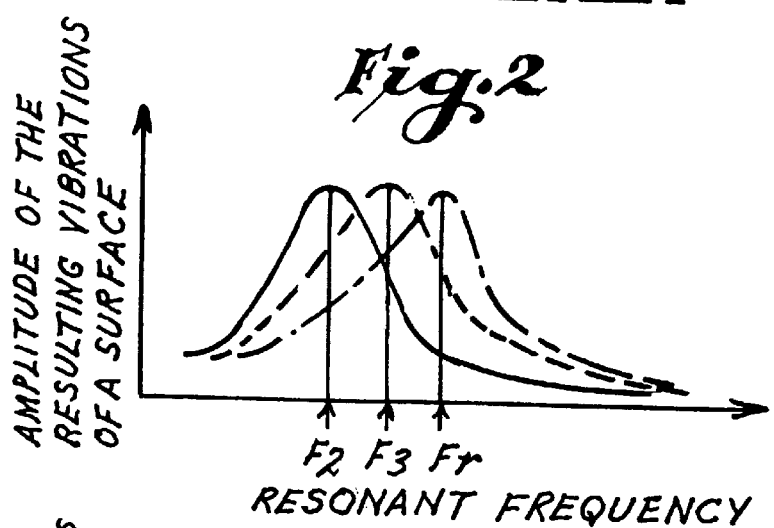
FIG. 2 is a graph showing changes in resonant frequency at a surface of a fluid/particle separator created by vibration generator(s) and based upon varying amplitudes of resulting vibrations of the surface.

In the feedback mode, the direct feedback sensors can be devices such as microphones 46, 48 for zones A and B, respectively, or transducers 53, 54, to monitor the application of the available acoustic energy to the area being vibrated for cleaning, the measurement point being considered as representative of one or more zones of the gas cleaning device and/or system. The feedback sensors can also be strain gauge-type transducers mounted to the surfaces to be vibrated, such as, for instance, the collecting plates 51 of an ESP 20 or the bags 55 of a BF 20' (FIG. 5), to measure the resonance conditions. During the course of the cleaning of the surfaces, their resonant frequency changes as depicted in FIG. 2. In FIG. 2, the solid line shows the resonant frequency of a surface before cleaning, the dotted line shows the resonant frequency after normal cleaning; and the dot-dashed line shows the resonant frequency of the surface when new or completely cleaned.

Figure 3:
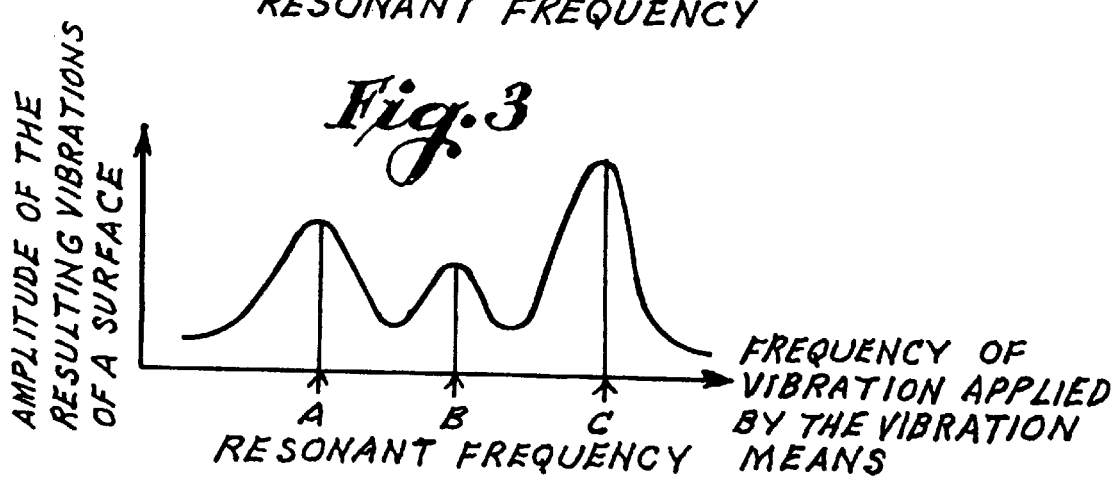
FIG. 3 is a graph showing the resonant frequency of three separate areas, zones or surfaces at various frequencies of vibration applied by a vibration generator.

This change in the frequency response of the surface can be used to determine automatically the duration of the vibration based on a predetermined change, or on the curve: change of frequency versus time. This is also applicable in other embodiments than those that use acoustic vibrations. Consequently, the control means can adjust the frequency, amplitude and duration of the vibration action of a mechanical, acoustic, electromechanical, air/gas current or air wave vibration generator based on the information provided by the feedback sensors. Indirect feedback means 60 such as the electrical signals of an ESP and/or of zones thereof (corresponding to voltage, current, power or the like), or signals 60' (FIG. 5) representative of pressure drop and/or gas flow of a BF and/or of zones thereof measured by appropriate transducers and the like such as, 61' (FIG. 5) for the gas flow through a selected bag of the bag type filter 20', can be used to optimize the resonance conditions in each zone A, B, C of such gas cleaning device and/or system as shown in FIG. 3. The sweep of the resonant frequency is used as a basis for the duration of the vibration effect, as well as for the amplitude of such vibration (by using the resonant frequency change versus time during vibration activity).

In a pre-determined mode, the control means may use a predetermined control table or program which provides, for each zone to be vibrated, the range of frequency, amplitude and duration to be applied, taking into account predicted changes in resonant frequency during vibration activity. Such table or program is incorporated in the controller, such as a computer, and is completed or configured on the basis of feedback mode operation, both direct and indirect, during set-up of the plant or on the basis of cleaning and/or operation of plants of the same design.

Information for the pre-determined mode in the form of a table of program is developed by sensing the operation of related equipment utilized over a period of time in the same manner as the gas cleaning device and/or system being controlled. For example, a similar gas cleaning device and/or system may have been monitored over a period of years. Information with respect to the response of the surfaces depending upon material build-up is collected and utilized to formulate a program for controlling like equipment. Further, information previously determined with respect to the operational characteristics of a particular gas cleaning device and/or system may be inputted into the controller so that the information with respect to a particular controller may be used as pre-determined program information for purposes of controlling the vibration generators used to operate the components of the gas cleaning device and/or system.

It is to be noted that the feedback mode, provided that the actual ranges of variation of vibration frequency are broad, allows the determination of the resonant frequency ($F_r$) of each zone (i.e., the frequency for which the amplitude of the resulting vibration is maximum), for instance, under completely clean conditions. After the deposition of dust, the resonant frequency is reduced as shown in FIG. 2. Then applying the above frequency ($F_r$) and varying this frequency upward and downward by a given step, the controller identifies whether the actual resonant frequency ($F_2$) is to be reached by increasing or decreasing the frequency. Then the stepwise frequency ($F_2$) is identified and it is possible to vibrate at such frequency ($F_2$) and by a similar process to follow the change of frequency from ($F_2$) to ($F_3$) where vibration is stopped.

A given surface may have several resonant frequencies, but a single frequency can be selected, for instance, the maximum amplitude, to apply the invention. Also, with a single vibration means with a broad range of possible frequencies, it is possible to vibrate several or all zones of a gas cleaning device, such as in an ESP the zone of the collecting plates 51 and the hoppers 52, see FIG. 1, and each of those items may have their own resonant frequency.

Another preferred embodiment of the invention as shown in FIG. 5 relates to a vibration method superposed/added to the normal gas flow in the gas cleaning device and or/system. For instance, in a reverse air BF 20' one compartment, as shown in FIG. 5, is isolated by shutting off the damper 66 and a reverse current of air 63 or of cleaned gas is pushed through the filter media of the bags 55 by a secondary fan or blower 62. This reverse air/gas current is then directed to the other compartments of the bag type filter where it is filtered in addition to the normal gas flow. This reverse current can remove some dust deposit, but is generally insufficient to clean the bags 55. A disk 64 with holes is rotated at constant speed to give to the reverse current a "vibration" part so that vibration with fixed frequency is applied to the bags 55. According to the invention, a variable frequency can be applied by means of a variable speed motor 65, or variable coupling or other suitable means.

The control means can operate under predetermined ranges of frequency, amplitude, and duration for each compartment, r based on feedback means as described above such as for instance the feedback sensors 32' or 61' associated to selected bag(s) 55. Moreover, when such vibration method is applied to the main flow, it is possible to apply a sufficiently wide range of frequencies so that resonance conditions are established in all zones of the gas cleaning device and/or system without the costs of isolating compartments and/or installing many feedback sensors. The same follow-up of the change of the resonant frequency during vibration activity, as described above, is applicable.

In other embodiments incorporating vibration of the particles in suspension in the gas stream, the vibration means or generator is preferably applied continuously with a similar follow-up as described above based on indirect feedback means, with periodic and variable frequencies to vibrate surfaces subject to deposit or build-up, either with the same vibration means or in combination with other vibration means.

INDUSTRIAL APPLICABILITY

The process and cleaning systems of the present invention have a wide range of applicability for us in cleaning a variety of fluid/particle separators and gas cleaning devices as outlined previously in the application including electrostatic precipatators, bag filters, spray dryer absorbers, evaporative coolers, cyclones, venturi scrubbers, dry systems, humidified dry systems, semi-dry systems, wet systems, combined systems, mechanical separators and the like.

We claim:

1. A method of controlling the cleaning and operation of components within a gas cleaning device using a vibration generator, comprising the steps of;
   a) determining resonant characteristics of at least one zone of the device by sensing vibrational conditions of the at least one zone of the device; and
   b) controlling the vibration generator and varying frequencies and amplitudes of vibrations being generated therefrom dependent upon the resonant characteristics determined at the at least one zone.

2. The method of claim 1 in which the step of determining resonant characteristics of at least one zone by sensing, and providing in real time, information with respect to vibration conditions at the at least one zone and supplying the information as feedback to a controller whereby the controller utilizes such information to vary the frequency and amplitude of vibrations being generated from the vibration generator.

3. The method of claim 1 in which the step of determining resonant characteristics of at least one zone includes supplying real time indirect information to the controller concerning operational parameters of the gas cleaning device.

4. The method of claim 2 in which the step of determining resonant characteristics of at least one zone includes supplying real time indirect information to the controller concerning operational parameters of the gas cleaning device.

5. The method of claim 3 in which the operational parameters are selected from a group of parameters consisting of gas flow rates through the at least one zone of the gas cleaning device, pressure differentials through components of the gas cleaning device, electrical information regarding voltage, current, and power of electrical components used in the gas cleaning device.

6. The method of claim 4 wherein said step of determining resonant characteristics of at least one zone includes the additional step of programming information into the controller with respect to resonant characteristics measured with respect to a similar gas cleaning device which have been previously determined.

7. The method of claim 1 including said vibration generator adding to the gas flow in the gas cleaning device a vibration component, and controlling said vibration generator so as to vary frequencies and amplitudes of the said vibration component.

8. The method of claim 1 wherein said step of determining resonant characteristics of at least one zone includes programming information into the controller with respect to resonant characteristics measured with respect to similar gas cleaning devices which have been previously determined.

9. A system for cleaning components within a gas cleaning device which includes a plurality of surface areas on which particles are deposited, the system comprising; a vibration generator, a controller operatively connected to said vibration generator, at least one direct vibration sensor means mounted to a surface area within said gas cleaning device, said at least one sensor means being operatively connected to said controller, and said controller being operative to vary frequency and amplitude of vibrations generated by said vibration generator dependent upon resonant characteristic information received from said at least one direct sensor means.

10. The system for cleaning of claim 9 wherein said at least one direct sensor means is selected from a group of sensors consisting of transducers, microphones and strain gauges.

11. The system for cleaning of claim 9 including at least one indirect sensor means for measuring parameters reflecting changes in gas flow through at least one component of the cleaning device, and said at least one indirect sensor means being operatively connected to said controller.

12. The system for cleaning of claim 9 in which said vibration generator includes a gas current generator for adding a vibration component to gas flow in the gas cleaning device.

13. The system for cleaning of claim 9 wherein said vibration generator includes an acoustic horn having an outlet, and damper means mounted to said horn for varying the frequency of vibrations generated therefrom.

14. The system for cleaning of claim 9 in which said vibration generator includes a fan means having a fluid outlet, a disc having a plurality of openings therein mounted adjacent said outlet, and means for rotating said disc at varying rates whereby the frequency of the change in the flow of fluid from said outlet is varied as it passes through said openings in said disc as it is rotated.

15. The system for cleaning of claim 9 in which said controller includes programmable means for receiving previously collected programmable information with respect to operative vibrational characteristics of a gas cleaning device.

16. The system for cleaning of claim 11 in which said controller includes programmable means for receiving previously collected programmable information with respect to operative vibrational characteristics of a gas cleaning device.

17. The system for cleaning of claim 12 in which said controller includes programmable means for receiving previously collected programmable information with respect to operative vibrational characteristics of a gas cleaning device.

18. A system for operating a gas cleaning device which includes a plurality of zones, the system comprising; at least one vibration generator, a direct vibration sensor means mounted to a surface within said gas cleaning device, a controller operatively connected to said at least one vibration generator, said controller including programmable means for receiving previously collected programmable information with respect to operative vibrational characteristics of the plurality of zones of the gas cleaning device, and said controller being operative to vary the frequency and amplitude of vibrations generated by the at least one vibration generator dependent upon information programmed therein and the data sensed by the direct vibration sensor means.

19. The system for operating of claim 18 including at least one sensor means for monitoring the evaporation of liquid droplets within at least one zone, said at least one sensor means being operatively connected to said controller whereby the frequency and amplitude of vibrations from said at least one vibration generator are varied so as to control a rate of evaporation of the droplets.

* * * * *